United States Patent
Cui et al.

(10) Patent No.: US 9,721,559 B2
(45) Date of Patent: Aug. 1, 2017

(54) DATA AUGMENTATION METHOD BASED ON STOCHASTIC FEATURE MAPPING FOR AUTOMATIC SPEECH RECOGNITION

(71) Applicant: International Business Machines Corporation, Armonk, NY (US)

(72) Inventors: Xiaodong Cui, White Plains, NY (US); Vaibhava Goel, Chappaqua, NY (US); Brian E. D. Kingsbury, Cortlandt Manor, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 168 days.

(21) Appl. No.: 14/689,730

(22) Filed: Apr. 17, 2015

(65) Prior Publication Data
US 2017/0040016 A1    Feb. 9, 2017

(51) Int. Cl.
*G10L 15/16* (2006.01)
*G10L 15/06* (2013.01)
*G10L 15/02* (2006.01)

(52) U.S. Cl.
CPC ............ *G10L 15/063* (2013.01); *G10L 15/02* (2013.01); *G10L 15/16* (2013.01)

(58) Field of Classification Search
CPC    G06K 9/00335; G06K 9/6261; G10L 15/063; G10L 15/07; G10L 15/144; G10L 21/06
USPC ........ 704/232, E21.019, 246, 231, 247, 250, 704/235, 270, 273; 382/209, 224
See application file for complete search history.

(56) References Cited

U.S. PATENT DOCUMENTS

| 7,548,651 | B2 * | 6/2009 | Shozakai ........... G06K 9/00335 382/209 |
| 8,260,615 | B1 | 9/2012 | Nakajima et al. |
| 8,825,482 | B2 * | 9/2014 | Hernandez-Abrego G10L 17/04 704/231 |
| 2012/0278061 | A1 | 11/2012 | Weinstein et al. |
| 2013/0185049 | A1 | 7/2013 | Zhao et al. |

OTHER PUBLICATIONS

Guo-Yu, Z. et al.; "Improving the performance of MGM-based voice conversion by preparing training data method"; 2004 International Symposium on Chinese Spoken Language Processing; pp. 181-184; IEEE; Dec. 15-18, 2004.

(Continued)

*Primary Examiner* — Charlotte M Baker
(74) *Attorney, Agent, or Firm* — William Stock; Otterstedt, Ellenbogen & Kammer, LLP

(57) ABSTRACT

A method of augmenting training data includes converting a feature sequence of a source speaker determined from a plurality of utterances within a transcript to a feature sequence of a target speaker under the same transcript, training a speaker-dependent acoustic model for the target speaker for corresponding speaker-specific acoustic characteristics, estimating a mapping function between the feature sequence of the source speaker and the speaker-dependent acoustic model of the target speaker, and mapping each utterance from each speaker in a training set using the mapping function to multiple selected target speakers in the training set.

7 Claims, 5 Drawing Sheets

(56) References Cited

OTHER PUBLICATIONS

Liliana et al.; "Voice Conversion Application (VOCAL)"; 2011 International Conference on Uncertainty Reasoning and Knowledge Engineering (URKE), pp. 259-262; IEEE; Aug. 4-7, 2011.

Ning, W. et al.; "Robust speaker verification using phase information of speech"; Proceedings 7th International Symposium on Chinese Spoken Language Processing (ISCSLP 2010) pp. 483-487 (Abstract Only); IEEE; Nov. 29, 2010-Dec. 3, 2010.

Internet Society et al.; "Requirements for Distributed Control of Automatic Speech Recognition (ASR), Speaker Identification/Speaker Verification (SI/SV), and Text-to-Speech (TTS) Resources"; An IP.com Prior Art Database Technical Disclosure; http://ip.com/IPCOM/000132358D; Dec. 9, 2005.

IBM; "Accuracy improvement of selection of source and destination points in speech recognition"; An IP.com Prior Art Database Technical Disclosure; http://ip.com/IPCOM/000012254D; Apr. 23, 2003.

Xiaodong Cui et al., unpublished U.S. Appl. No. 14/977,674, filed Dec. 22, 2015, Data Augmentation Method Based on Stochastic Feature Mapping for Automatic Speech Recognition, pp. 1-24 and 5 sheets of drawings.

List of IBM Patents or Applications Treated as Related.

\* cited by examiner

DATA AUGMENTATION METHOD BASED ON STOCHASTIC FEATURE MAPPING FOR AUTOMATIC SPEECH RECOGNITION

GOVERNMENT LICENSE RIGHTS

This invention was made with Government support under Contract No.: W911NF-12-C-0012 awarded by Department of Defense (DOD). The Government has certain rights in this invention.

BACKGROUND

The present disclosure relates to speech processing, and more particularly to a method for augmenting training data for speech recognition.

Data augmentation based on label-preserving transformations has been shown to be very effective at improving the robustness of deep neural networks, especially when the training data is limited. It is commonly used in image recognition where transformations such as translation, rotation, scaling and reflection have led to significant improvements in recognition accuracy.

Data augmentation in speech-related applications is not a new practice. For instance, sometimes under the name of multi-style training, artificial noisy speech data is generated by adding noise to clean speech data for training noise robust acoustic models in automatic speech recognition (ASR). Another example is IMELDA where multi-condition transforms are learned from tilted, noisy and un-degraded speech data so that the sensitivity of the transforms to those conditions is reduced.

When it comes to deep neural network (DNN) or convolutional neural network (CNN) acoustic modeling, which has achieved the state-of-the-art performance in ASR nowadays, there is less reported work on data augmentation algorithms that are specifically designed to deal with speaker variability and acoustic variability for DNN or CNN training. Most recently, vocal tract length perturbation (VTLP) was proposed for augmenting data in CNN training. Experiments on the TIMIT database have shown decent improvements in phone error rate (PER). Data augmentation using stochastic feature mapping (SFM) has been proposed for DNN acoustic modeling. SFM augments training data by mapping speech features from a source speaker to a target speaker, which is equivalent to a special type of voice conversion in some designated feature space.

BRIEF SUMMARY

According to an exemplary embodiment of the present invention, a stacked architecture for generating augmented training data for speech recognition combines VTLP and SFM in a two-stage data augmentation.

According to an embodiment of the present invention, a method of augmenting training data includes converting a feature sequence of a source speaker determined from a plurality of utterances within a transcript to a feature sequence of a target speaker under the same transcript, training a speaker-dependent acoustic model for the target speaker for corresponding speaker-specific acoustic characteristics, estimating a mapping function between the feature sequence of the source speaker and the speaker-dependent acoustic model of the target speaker, and mapping each utterance from each speaker in a training set using the mapping function to multiple selected target speakers in the training set.

According to an embodiment of the present invention, a method of augmenting training data having a multi-stage data augmentation scheme using a stacked architecture, said method comprising, in a first stage: building a bottleneck neural network, training the bottleneck neural network with augmented training data to determine a trained bottleneck neural network, and extracting a plurality of features using a bottleneck layer of the trained bottleneck neural network, and in a second stage: building a neural network whose input features includes the features extracted from the trained bottleneck neural network from the first stage, wherein the neural network is trained with the augmented training data.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

BRIEF DESCRIPTION OF THE SEVERAL VIEWS OF THE DRAWINGS

Preferred embodiments of the present invention will be described below in more detail, with reference to the accompanying drawings.

DETAILED DESCRIPTION

According to an exemplary embodiment of the present invention, training data for a neural network acoustic model is augmented using stochastic feature mapping (SFM). The SFM is a label-preserving transformation that augments the training data by mapping speech features from a source speaker to a target speaker. The SFM generates acoustic context/variation information for the target speaker that does not exist in the original training data, enriching the acoustic information for training speakers. The mapping between speakers is statistically estimated and does not rely on any particular spectral manipulation. As a general transformation approach the mapping is applicable to any signal space for the data augmentation purpose.

Embodiments of the present invention can be applied to any speech-related statistical model training including automatic speech recognition, speech enhancement, speech synthesis, etc.

Figure 1:
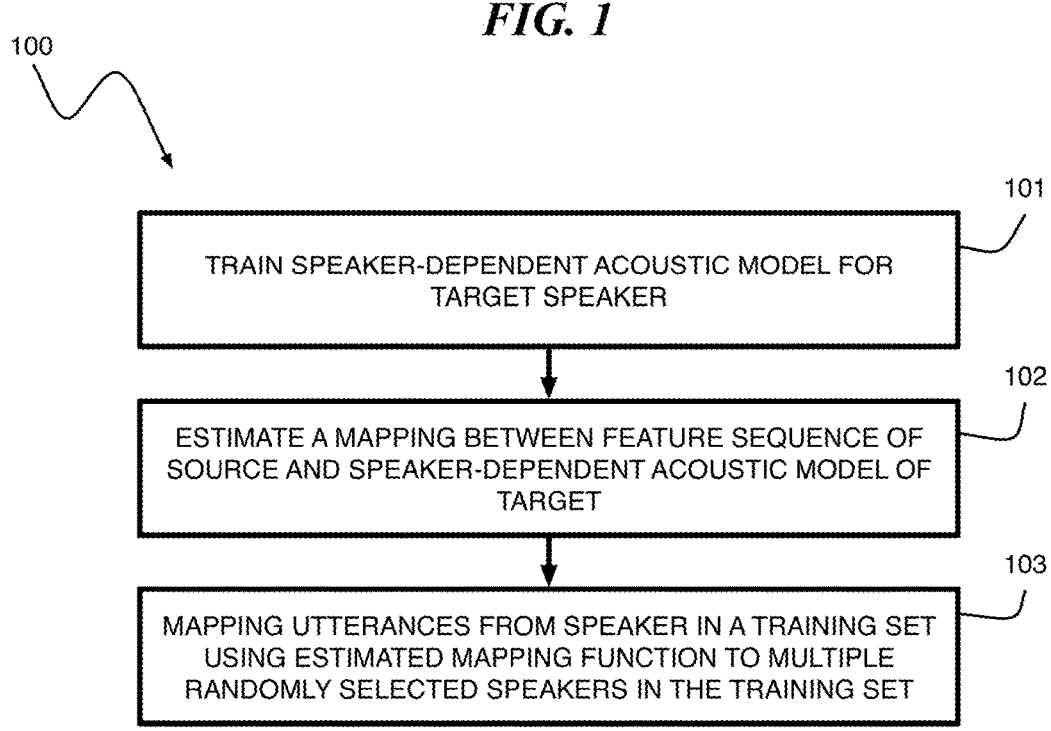
FIG. 1 is a method for augmenting training data according to an exemplary embodiment of the present invention.

According to an exemplary embodiment of the present invention, the training data is augmented (see FIG. 1, 100), converting a feature sequence of one speaker (source speaker S) in each utterance to a feature sequence of another speaker (target speaker B) under the same transcripts. More particularly, a speaker-dependent acoustic model is trained for the target speaker for his/her speaker-specific acoustic characteristics 101. Estimating a mapping function 102 in the form of linear or nonlinear functions between the feature sequence of the source speaker and the speaker-dependent acoustic model of the target speaker. For each speaker in the training set, all the utterances from this speaker are mapped using the estimated mapping function to multiple randomly selected speakers in the training set 103.

The mapping is carried out throughout the speakers in the training set. Each speaker is treated as a source speaker. Multiple target speakers in the training set are selected, different from the source speaker of course, and the source speaker is mapped to those selected target speakers. This is conducted for every each speaker in the training set to augment the training data. The selection here is random but it is not limited to random selection. The selection can be made based on some acoustic knowledge such as gender, dialect, environment, etc.

According to an exemplary embodiment of the present invention, SFM is carried out in the log-Mel domain in convolutional neural network (CNN) training. According to an exemplary embodiment of the present invention, a two-stage data augmentation scheme with a stacked architecture that combines vocal tract length perturbation (VTLP) and SFM as complementary approaches. In this scheme, a bottleneck CNN is trained using data augmented by VTLP as a feature extractor in the first stage. The extracted bottleneck features are further normalized by speaker adaptive training based on linear mapping (F maximum likelihood linear regression (FMLLR)). The speaker-adapted bottleneck features (with context) are again employed as input to build another DNN as the final classifier using data augmented by SFM in the second stage. Since VTLP and SFM generate data in different ways, this stacked architecture can make use of the merits of both approaches.

Figure 2:
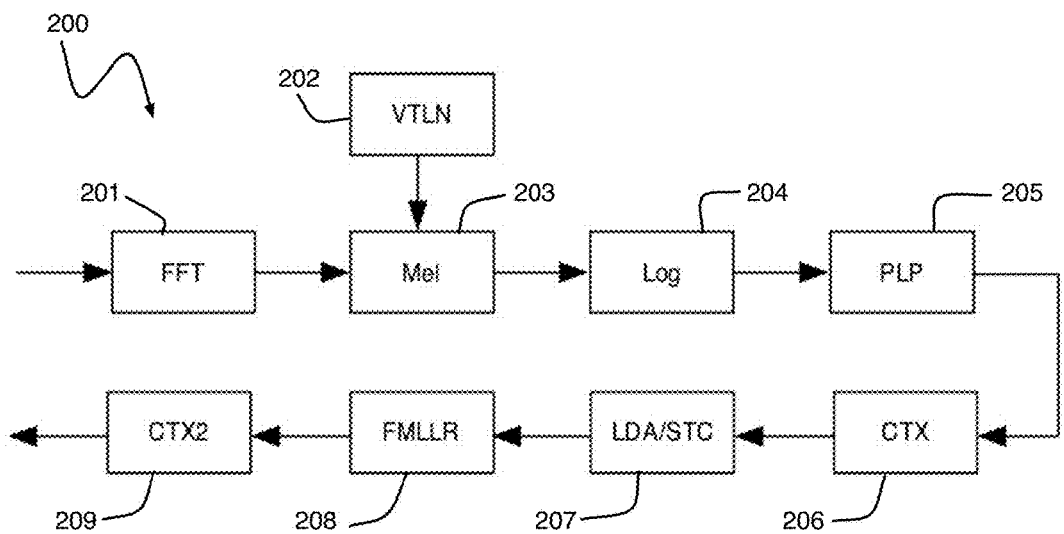
FIG. 2 is a diagram of a speaker adaptive feature space for DNN models according to an exemplary embodiment of the present invention.

Referring to the data augmentation for DNNs, VTLP and SFM are applicable for DNN models in the speaker adaptive feature space as shown in FIG. 2, where 9 frames (CTX2=±4) of adjacent speaker-adapted features are used as input to the DNNs. In this context, VTLP and SFM are conducted at blocks 202 and 209, respectively.

More particularly, FIG. 2 shows a feature extraction pipeline 200. Speech input is transformed into linear spectrum using fast Fourier transformation (FFT) at 201 and then converted to the Mel-frequency scale at block 203. The Mel-frequency output is taken logarithm at 204 and converted into 13-dimensional mean-normalized perceptual linear prediction (PLP) features at 205 with vocal tract length normalization (VTLN) using 202. According to an embodiment of the present invention, the PLP features are used as the fundamental acoustic features. The PLP features are a type of non-topographical input. The PLP features are after a series of transforms without spatial correlations. After taking into account the context (CTX) information by splicing adjacent 9 frames at 206, a linear discriminant analysis (LDA) is used to project the feature dimensionality down to 40 at 207. Also at 207, the components of LDA features are further decorrelated by a global semi-tied covariance (STC). For implementation convenience, the two transformation matrices from LDA and STC are combined to create a transformation matrix (this feature space is referred to as the LDA space). In this LDA space, speaker adaptive training (SAT) using feature space maximum likelihood linear regression (FMLLR) is applied at 208 to reduce the speaker variability.

Referring to the VTLP, for each utterance in the training set a warping factor is randomly chosen from [0:9; 1:1] to warp the Mel-frequency axis and generate a new replica of the original data. In a modified version of VTLP, the warping factor is perturbed deterministically according to Eq. 1

$$\alpha \mapsto \{\alpha-4, \alpha-2, \alpha+2, \alpha+4\} \quad (1)$$

Eq. 1 follows the notation in the IBM Attila toolkit in which the vocal tract length warping factor is quantized between [0:8; 1:25]. As a result, the estimated warping factor is an integer between [0; 20] with 10 equivalent to the neutral warping factor 1.0.

According to Eq. 1, VTLN warping factor for a speaker is first estimated and then perturbed in both positive and negative directions by small shifts (±2 and ±4) to give 4 more warping factors. The perturbed warping factors, if beyond [0:8; 1:25], are clipped to 0.8 or 1.25, which corresponds to integer 0 or 20, respectively.

Referring to the SFM, to conduct SFM, one needs to choose a source speaker, a target speaker and a desired feature space. A speaker dependent model is built for the target speaker. A mapping between the two speakers is estimated in the chosen feature space based on the feature sequences from the source speaker and the speaker-dependent model of the target speaker under a selected statistical criterion.

SFM is designed with respect to the speaker adaptive feature space in FIG. 2 for DNN models. The LDA space is the feature space in which the mapping is created. The speaker dependent model for the target speaker B in the LDA space $\lambda_{LDA}^{(B)}$ is estimated by model space maximum likelihood linear regression (MLLR). A linear mapping (FMLLR) between the source and the target speakers is estimated under the maximum likelihood (ML) criterion $$\{\tilde{A}, \tilde{b}\} = {}_{\{A, b\}}{}^{arg\,max} \log P(AO_{LDA}^{(S)} + b | \lambda^{(B)}) \quad (2)$$

After the linear transformation $\{\tilde{A}, \tilde{b}\}$ is estimated, the LDA feature sequence for the target speaker B is obtained by:

$$O_{LDA}^{(B)} = \tilde{A} O_{LDA}^{(S)} + \tilde{b} \quad (3)$$

and the speaker-adapted feature sequence of the target speaker is obtained as $$O_{FMLLR}^{(B)} = A^{(B)}(\tilde{A} O_{LDA}^{(S)} + \tilde{b}) + b^{(B)} \quad (4)$$

where $\{A^{(B)}, b^{(B)}\}$ are speaker adaptive linear transformation (FMLLR) 208 in FIG. 2 for the target speaker.

To augment the training data, for each speaker in the training set a number of speakers are randomly chosen from the same training set as target speakers. All feature sequences of this speaker are mapped to those target speakers.

Referring to data augmentation for CNNs, CNNs are typically more invariant to pattern variabilities (than DNNs) due to the normalization effect of convolutions in local receptive fields and subsequent pooling. For example, speaker variability caused by vocal tract differences can be effectively reduced by CNNs. This property makes CNNs useful when the training data is sparse.

Since the input to CNNs is topographical (e.g., an image having spatial correlations from a spectrogram), normalized log-Mel features with context are used where the outputs of the Mel-frequency filter bank after VTLN are taken the logarithm and their speaker-dependent mean is computed and subtracted. The normalized log-Mel features are spliced with their left and right 5 adjacent frames to form a feature map. Two other feature maps are created by computing the difference between two adjacent features, deltas, and double deltas, the difference between two deltas. It is the second order difference of two adjacent features. Delta and double deltas are used to describe the feature dynamics.

Figure 3:
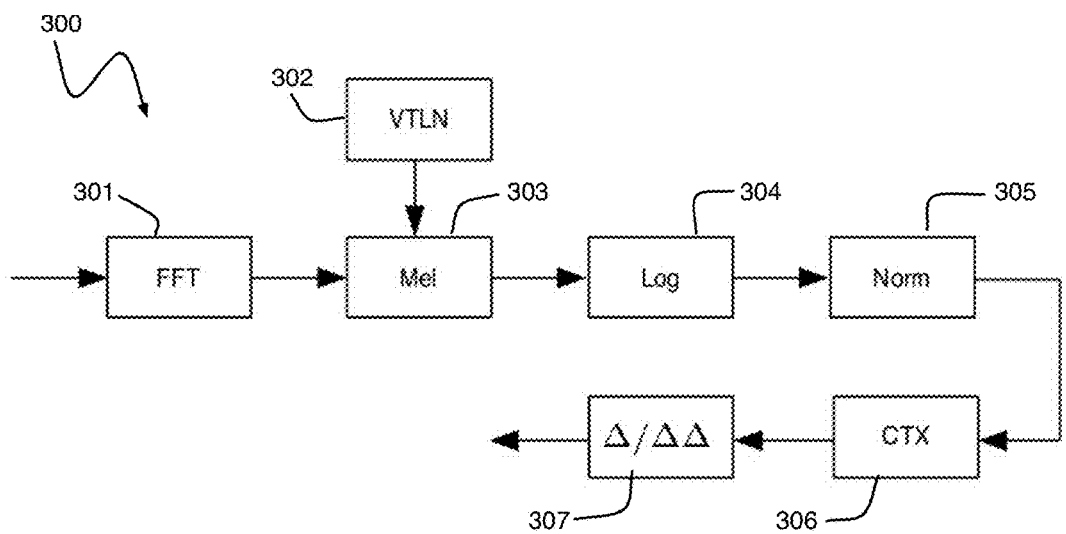
FIG. 3 is a diagram of a normalized log-Mel feature space for CNN models according to an exemplary embodiment of the present invention.

Given the normalized log-Mel input features, VTLP is extended to CNN and Eq. 1 can be directly applied as shown at 300, FIG. 3.

In FIG. 3, the speech input is transformed into linear spectrum using FFT at 301 and converted to the Mel-frequency scale after VTLN at blocks 302-303. The output of the Mel-frequency filter bank is taken logarithm at 304 and mean normalization at 305. The normalized log-Mel features are spliced with their left and right 5 adjacent frames to form a feature map at 306. Two other feature maps are created by computing deltas and double deltas at 307 by taking first and second order difference of adjacent features.

To apply SFM in the log-Mel feature space, the SFM procedure is used to build a speaker-dependent model in the log-Mel feature space and estimate a linear transformation in that space to transform the data. Different from the speaker-adaptive feature space in the DNN scenario, dimensions of the log-Mel features, which are the outputs of Mel-frequency filter bank, are strongly correlated. Since the standard FMLLR estimation assumes diagonal covariances in Gaussian Mixture Models (GMMs), it cannot be directly applied to the log-Mel feature space. To address this, the log-Mel feature space is diagonalized before estimating the FMLLR transformation. After the features are transformed in the diagonalized space they are transformed back to the original log-Mel space. The diagonalization is accomplished by a global semi-tied covariance (STC) transformation 207. This mapping from the source speaker S to the target speaker B is indicated in Eq. 5:

$$O_{Log\ MEL}^{(B)} = C^{-1} \cdot F \cdot C \cdot O_{Log\ MEL}^{(S)} \quad (5)$$

where C is the STC transformation and $C^{-1}$ is its inverse. F is the (augmented) MLLR (FMLLR) transformation in the diagonalized log-Mel feature space. FMLLR has an augmented format, wherein Y=[A b][X 1]', where X is augmented to [X 1]. Here F is used to represent [A b] in one matrix. Note that in order to estimate the FMLLR transformation in the diagonalized space, the speaker dependent model of the target speaker $\lambda^{(B)}$ is trained with STC. This diagonalization approach in Eq. 5 can also be used in speaker normalization for CNN inputs for certain cases.

Referring now to a data augmentation scheme according to an exemplary embodiment of the present invention, while both VTLP and SFM augment training data based on label-preserving transformations, they augment in different ways.

Figure 4:
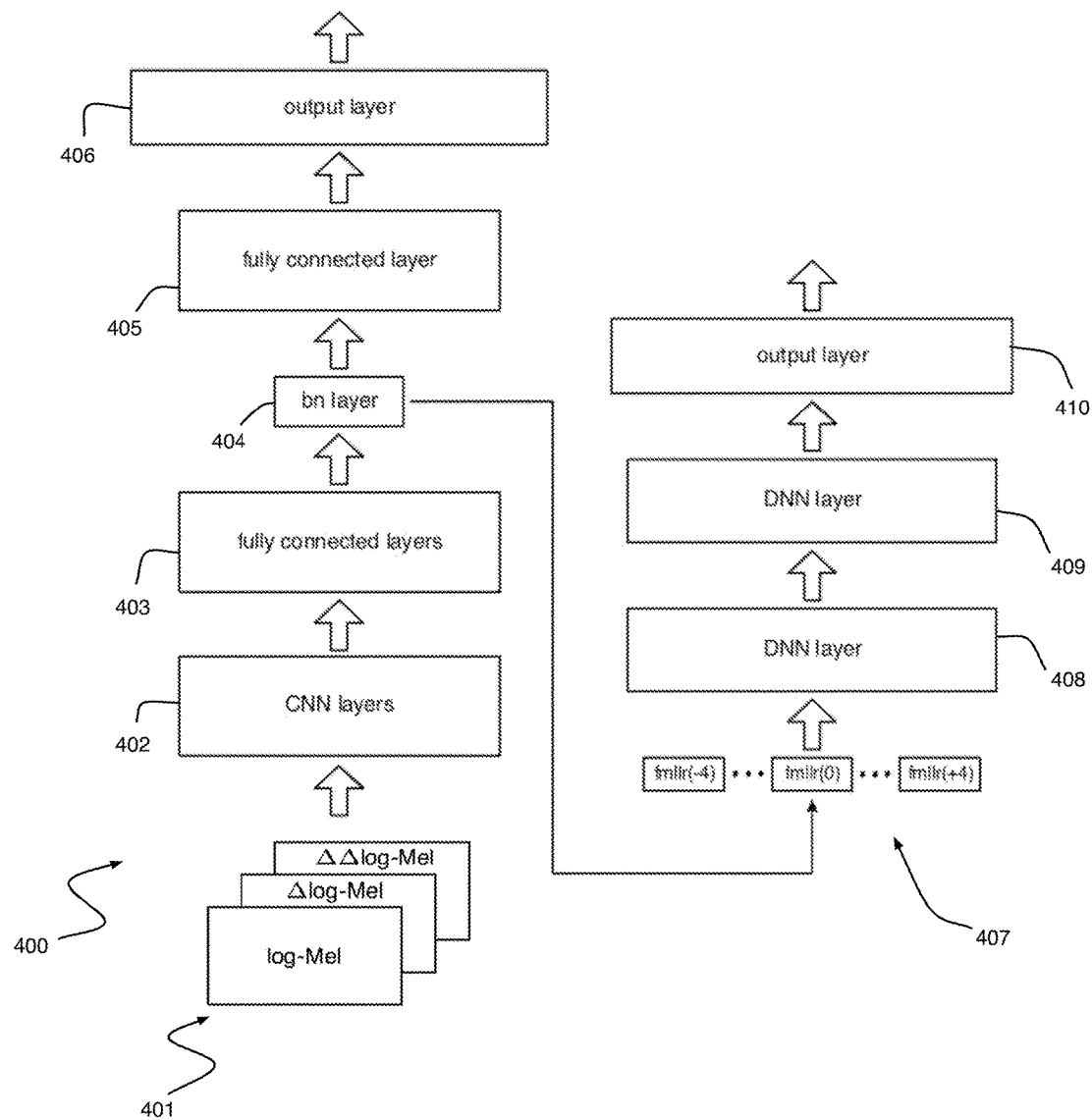
FIG. 4 is a diagram of a stacked architecture that combines VTLP and SFM for two-stage data augmentation.

VTLP attempts to create "new" speakers by perturbing the vocal tract length of a speaker, which is effective for systems that use Mel-frequency as their final feature space. SFM does not create new speakers but by statistically mapping feature sequences between speakers it can improve acoustic richness in the training data. According to an embodiment of the present invention, these two approaches are applied in a complementary manner in a two-stage data augmentation scheme having a stacked architecture (see FIG. 4).

In a first stage (401-406), a bottleneck CNN is built at 402 with mean normalized log-Mel features 401 as input. This CNN is trained with training data augmented using VTLP (at 403-406). A bottleneck layer is one layer adjacent to the last fully connected layer in the network at 404. After the bottleneck CNN is trained at 404, it is used as a feature extractor where the input to the sigmoid nonlinear activation function of the bottleneck layer is used as the features. The input of the sigmoid nonlinearity provides a good dynamic range of the features and furthermore the resulting linear features are roughly normally distributed, which benefits the speaker adaptive GMM training. Since the CNN is trained with VTLP, the features extracted this way are expected to be more speaker invariant than the original features.

Figure 5:
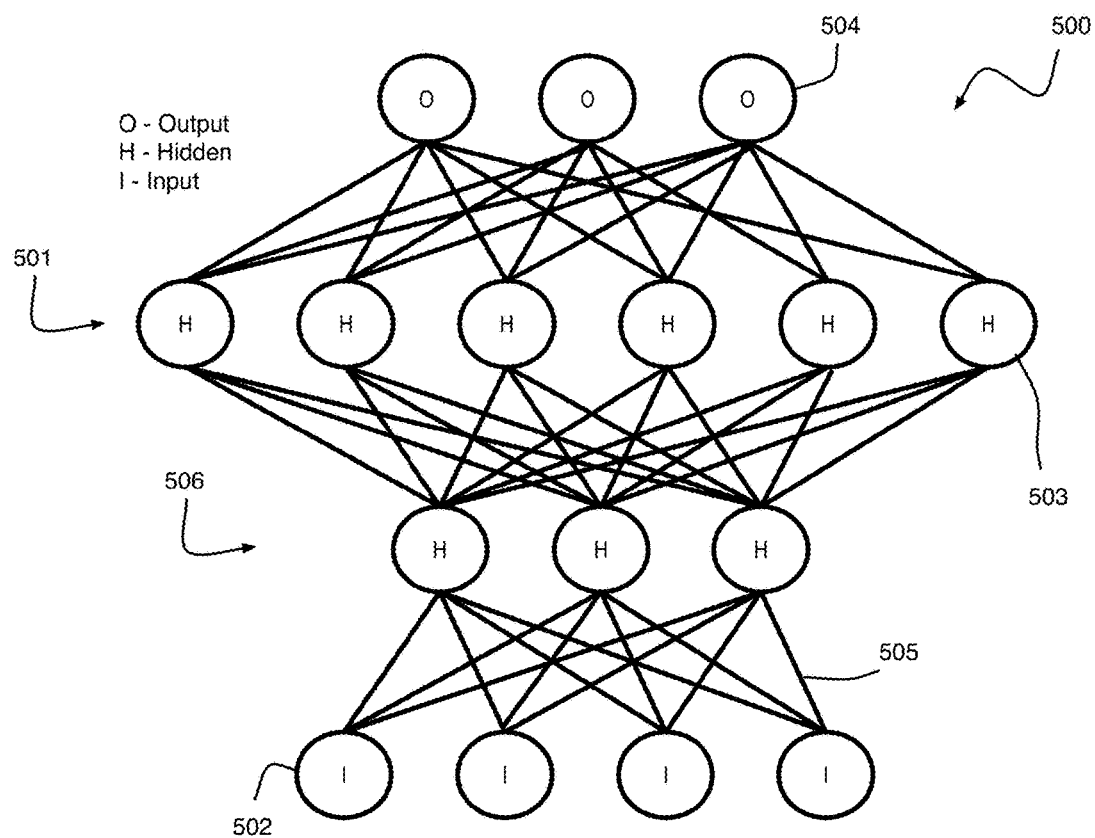
FIG. 5 is an exemplary neural network according to an embodiment of the present disclosure.

Referring to FIG. 5, a neural network 500 comprises a plurality of units 501, including input units 502, hidden units 503 and output units 504. The units 501 can be connected by edges, e.g., 505, which can be weighted according to the strength of the edges. It should be understood that neural networks typically have four or more hidden layers, and that FIG. 5 is merely an example used for describing exemplary embodiments. That is, the present disclosure is not limited to two hidden layers as shown in FIG. 5. Furthermore, in FIG. 5, layer 506 is a bottleneck layer.

Upon the extracted bottleneck features at 404, a maximum likelihood (ML) speaker-adaptive model based on FMLLR is estimated 407. It has been observed that speaker adaptation on the bottleneck features helps the stacked bottleneck architecture.

In a second stage (407-410), a DNN is built whose input is the speaker-adaptive features coming from the feature space of the speaker-adaptive model. This DNN is trained with training data augmented using SFM, through which the acoustic richness of the training data is further improved.

Experimental data is described herein, which is conducted on the IARPA Babel Haitian Creole LLP. The IARPA Babel Haitian Creole LLP comprises 23.8 hours of telephony data for the training data set and 20.1 hours of telephony data for the development set. The training data set includes scripted and conversational speech while the development set includes conversational speech only. Specifically, the training set is composed of 19.9 hours of conversational data and 3.9 hours of scripted data. Most of the data is sampled at 8 KHz. A small portion of the data is originally sampled at 48 KHz but down-sampled to 8 KHz for training. Approximately 40%-50% of the audio is speech.

The following presents exemplary performance for VTLP and SFM under the DNN and CNN architectures and exemplary performance of a two-stage data augmentation scheme under the stacked CNN architecture according to an embodiment of the present invention.

Referring to DNN experiments, the baseline DNN acoustic model has 5 hidden layers of 1024 hidden units with sigmoid activation functions and a softmax output layer. The input to the network is 9 adjacent frames of 40 dimensional speaker adaptive features. Therefore, the total dimensionality of the input is 360. The network is initialized with layer-wise discriminative pre-training. After the pre-training, it is first optimized by 15 iterations of cross-entropy (CE) training followed by 30 iterations of Hessian-free (HF) sequence training based on the state-level minimum Bayes risk (sMBR) criterion. In the case of data augmentation, both VTLP and SFM generate 4 replicas of the original data, which makes the augmented training data 5 times larger than the original training data.

TABLE 1

Word error rates (WERs) of DNN baseline and data augmented DNN acoustic models.

| model | data augmentation | CE | sMBR |
|---|---|---|---|
| DNN | none | 66.9 | 62.8 |
|  | VTLPx4 | 62.2 | 59.6 |
|  | SFMx4 | 62.3 | 59.1 |

Table 1 shows the WERs of the baseline DNN model without data augmentation and the WERs of the DNN models trained using VTLP and SFM. After HF sequence training, the WER of the baseline DNN is 62.8% while the WERs of data augmented DNN models under VTLP and SFM are 59.6% and 59.1%, respectively. Both data augmentation techniques improve the ASR performance. SFM in this case is 0.5% absolute better than VTLP.

Referring to CNN experiments, the baseline CNN model has two convolutional layers followed by five fully connected feedforward layers. All hidden layers use sigmoid activation functions and the output layer is softmax. The input features to the first convolutional layer are 40-dimensional log-Mel features with VTLN and their deltas and double deltas. The temporal context is 11 frames. There are 128 hidden units (feature maps) in the first convolutional layer, the local receptive field has an overlapping window of 9×9 with a shift of 1 in both temporal and spectral domains, which results in 32×3 windows for each feature map. On top of that, max pooling is applied in a 3×1 non-overlapping window which results in 11×3 windows for each feature map. There are 256 hidden units (feature maps) in the second convolutional layer, the local receptive field has an overlapping window of 4×3 with a shift of 1 in both temporal and spectral domains which results in 8×1 windows for each feature map. Following the second convolutional layer are four fully connected feedforward layers, each containing 1,024 units. The training of the CNN is similar to that of the DNN described herein, which includes 15 iterations of CE training followed by 20 iterations of HF sMBR sequence training.

TABLE 2

Word error rates (WERs) of CNN baseline and data augmented CNN acoustic models.

| model | data augmentation | CE | sMBR |
|---|---|---|---|
| CNN | none | 64.6 | 61.2 |
|  | VTLPx4 | 61.9 | 58.4 |
|  | SFMx4 | 61.2 | 58.7 |

Table 2 shows the WERs of the baseline CNN model without data augmentation and the WERs of the CNN models trained using VTLP and SFM. After HF sequence training, the WER of the baseline CNN is 61.2% while the WERs of data augmented DNN models under VTLP and SFM are 58.4% and 58.7%, respectively. The CNN baseline model (61.2%) is 1.6% absolute better than the DNN baseline (62.8%), which indicates that the CNN model is better than the DNN model given the sparse training data. Similar to the DNN scenario, both data augmentation techniques improve the ASR performance for CNN models. VTLP in this case is 0.3% absolute better than SFM.

Referring to an exemplary implementation of a two-stage data augmentation performed on experimental data, for the two-stage data augmentation scheme according to one or more embodiments of the present invention, the bottleneck CNN has two convolutional layers followed by six fully connected feedforward layers among which the second topmost layer is a bottleneck layer. Other than the bottleneck layer, all other layers including both convolutional and fully connected layers have the same setup as that for the CNN experiments. The bottleneck layer consists of 40 hidden units. The training of this bottleneck CNN is composed of 15 iterations of CE training followed by 20 iterations of HF sMBR sequence training. VTLP is used in the training of this stage where 4 replicas of the original data are generated.

The input to the sigmoid nonlinearity in the bottleneck layer is chosen as the features for the next stage DNN training. The reason behind it is that after comparing the performance using the input and output of the sigmoid nonlinearity of the bottleneck layer, the input to the sigmoid has an improved dynamic range as features which benefits the speaker adaptive training in the later stage.

The DNN training in the second stage employs the speaker adapted bottleneck features as input. There are 2 hidden layers in the DNN and each layer has 1,024 hidden units with sigmoid nonlinear activation functions. The DNN model is first trained using 15 iterations of CE training then followed by 30 iterations of HF sMBR sequence training. SFM is applied in this stage together with VTLP. So a total of 8 replicas of the original data are generated.

TABLE 3

Word error rates (WERs) of baseline CNN and CNN/DNN using two-stage data augmentation.

| Model | data augmentation | CE | sMBR |
|---|---|---|---|
| CNN baseline | none | 64.6 | 61.2 |
| CNN | VTLPx4 | 61.9 | 58.4 |
| CNN-bn40 | VTLPx4 | 62.9 | 59.1 |
| CNN-bn40-fmllr DNN | VTLPx4 | 60.1 | 58.0 |
| CNN-bn40-fmllr DNN | VTLPx4 + SFMx4 | 59.2 | 57.1 |

Table 3 shows the WERs of the baseline CNN model without data augmentation and the WERs of the stacked architecture that uses the proposed two-stage data augmentation. The WER of the CNN baseline is 61.2% and with VTLP it is reduced to 58.4%, which has already been reported in Table 2. When adding a bottleneck layer, the WER of the bottleneck CNN model with VTLP is 59.1% which is 0.7% worse than without using the bottleneck layer. However, when using the speaker adapted bottleneck features to train the DNN using SFM on top of VTLP, the final WER is 57.1%. Therefore, after combining VTLP and SFM using the stacked architecture, this two-stage data augmentation scheme is 1.3% absolute better than CNN using VTLP and 1.6% absolute better than CNN using SFM.

The methodologies of embodiments of the disclosure may be particularly well-suited for use in an electronic device or alternative system. Accordingly, embodiments of the present invention may take the form of an entirely hardware embodiment or an embodiment combining software and hardware aspects that may all generally be referred to herein as a "processor," "circuit," "module" or "system."

Furthermore, it should be noted that any of the methods described herein can include an additional step of providing system 400 for generating augmented training data for speech recognition. Further, a computer program product can include a tangible computer-readable recordable storage medium with code adapted to be executed to carry out one or more method steps described herein, including the provision of the system with the distinct software modules.

Figure 6:
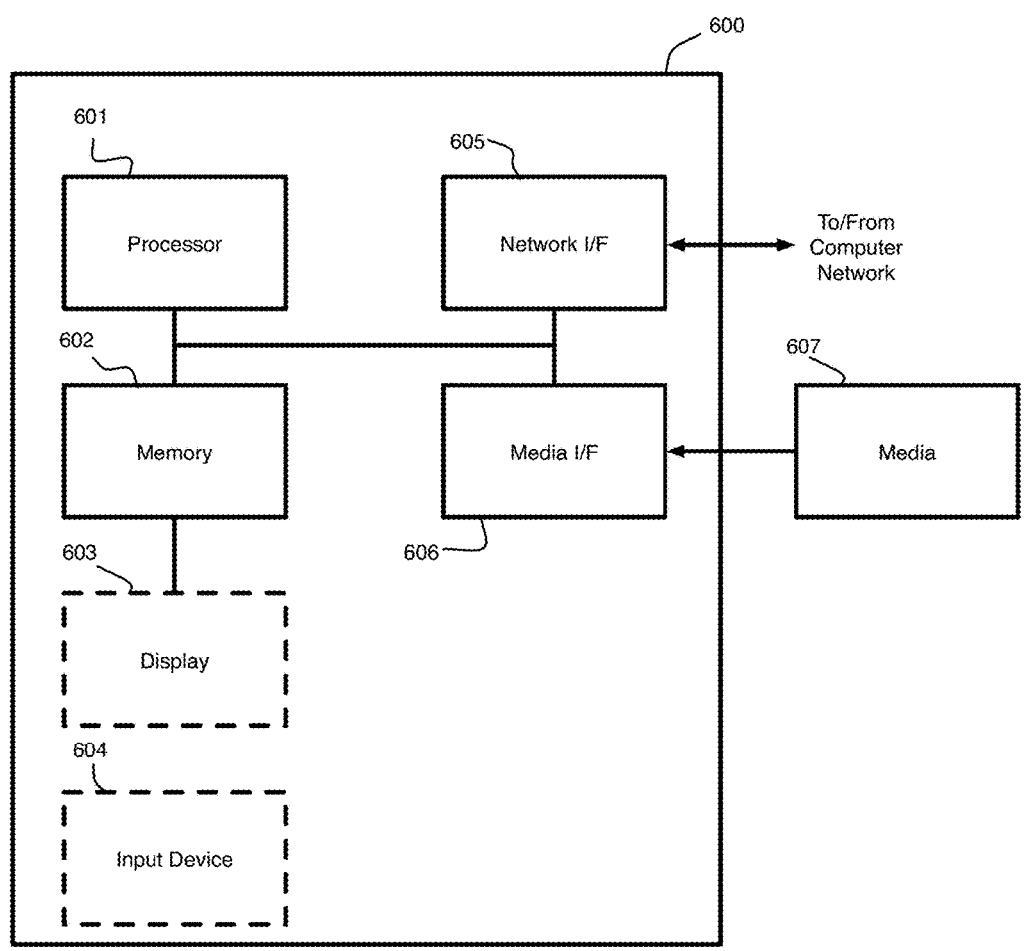
FIG. 6 is a diagram of a computer system configured to augmenting training data according to an exemplary embodiment of the present invention.

Referring to FIG. 6; FIG. 6 is a block diagram depicting an exemplary computer system embodying the system 400 (see FIG. 4) according to an embodiment of the present invention. The computer system shown in FIG. 6 includes a processor 601, memory 602, display 603, input device 604 (e.g., keyboard), a network interface (I/F) 605, a media I/F 606, and media 607, such as a signal source, e.g., camera, Hard Drive (HD), external memory device, etc.

In different applications, some of the components shown in FIG. 6 can be omitted. The whole system shown in FIG. 6 is controlled by computer readable instructions, which are generally stored in the media 607. The software can be downloaded from a network (not shown in the figures), stored in the media 607. Alternatively, software downloaded from a network can be loaded into the memory 602 and executed by the processor 601 so as to complete the function determined by the software.

The processor 601 may be configured to perform one or more methodologies described in the present disclosure, illustrative embodiments of which are shown in the above figures and described herein. Embodiments of the present invention can be implemented as a routine that is stored in memory 602 and executed by the processor 601 to process the signal from the media 607. As such, the computer system is a general-purpose computer system that becomes a specific purpose computer system when executing routines of the present disclosure.

Although the computer system described in FIG. 6 can support methods according to the present disclosure, this system is only one example of a computer system. Those skilled of the art should understand that other computer system designs can be used to implement embodiments of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of augmenting training data comprising:
  receiving, by a computer system, a training set of sampled audio data including speech of a plurality of source speakers;
  for each of the plurality of source speakers;
    converting, by the computer system, a feature sequence of a source speaker, of the plurality of source speakers, determined from a plurality of utterances of scripted speech within the training set, to a feature sequence of a respective target speaker under the same scripted speech, wherein the feature sequence of the respective target speaker is added to the training set;
    training, by the computer system, a speaker-dependent acoustic model for the respective target speaker for corresponding speaker-specific acoustic characteristics; and
    estimating, by the computer system, a mapping function between the feature sequence of the source speaker and the speaker-dependent acoustic model of the respective target speaker; and
  for each of the plurality of source speakers:
    mapping, by the computer system, each of the utterances from each of the plurality of source speakers in the training set using the mapping function to a plurality of other source speakers of the plurality of source speakers, wherein the mapping is added to the training set to generate augmented training data configured to train an automatic system recognition computer system.

2. The method of claim 1, wherein the speaker-dependent acoustic model is estimated using a criteria including one or more of a maximum likelihood criterion, a maximum mutual information criterion and a minimum phone error criterion.

3. The method of claim 1, wherein the mapping function is one of a linear function, an affine function and a nonlinear function.

4. The method of claim 1, further comprising training the automatic system recognition computer system using the augmented training data.

5. The method of claim 1, further comprising selecting the plurality of the source speakers randomly.

6. The method of claim 1, further comprising selecting the plurality of the source speakers using a criterion including at least one of vocal tract length, dialect, and signal-to-noise ratio.

7. The method of claim 1, wherein the respective target speaker is a new speaker created by perturbing a vocal tract length of the source speaker.

* * * * *